United States Patent
Dalla Palma et al.

(10) Patent No.: US 12,435,787 B2
(45) Date of Patent: *Oct. 7, 2025

(54) HYDROMECHANICAL TRANSMISSION WITH HYDROSTATIC ASSEMBLY AND HYDROSTATIC ASSEMBLY CONTROL METHOD

(71) Applicant: DANA ITALIA S.R.L., Arco (IT)

(72) Inventors: Lorenzo Dalla Palma, Arco (IT); Fabio Gunsch, Arco (IT); Mario Gelmini, Arco (IT)

(73) Assignee: DANA ITALIA S.R.L., Arco (IT)

( * ) Notice: Subject to any disclaimer, the term of this patent is extended or adjusted under 35 U.S.C. 154(b) by 85 days.

This patent is subject to a terminal disclaimer.

(21) Appl. No.: 18/492,380

(22) Filed: Oct. 23, 2023

(65) Prior Publication Data

US 2024/0044403 A1    Feb. 8, 2024

Related U.S. Application Data

(63) Continuation of application No. 17/804,056, filed on May 25, 2022, now Pat. No. 12,104,694.

(51) Int. Cl.
| | | |
|---|---|---|
| *F16H 47/04* | (2006.01) | |
| *F16H 61/4035* | (2010.01) | |
| *F16H 61/42* | (2010.01) | |
| *F16H 61/421* | (2010.01) | |

(52) U.S. Cl.
CPC ......... *F16H 61/4035* (2013.01); *F16H 47/04* (2013.01); *F16H 61/42* (2013.01); *F16H 61/421* (2013.01); *F16H 2200/0039* (2013.01); *F16H 2200/0086* (2013.01); *F16H 2200/2005* (2013.01); *F16H 2200/2041* (2013.01)

(58) Field of Classification Search
CPC ...... F16H 47/04; F16H 61/4035; F16H 61/42; F16H 61/421; F16H 2200/0039; F16H 2200/0086; F16H 2200/2005; F16H 2200/2041

See application file for complete search history.

(56) References Cited

U.S. PATENT DOCUMENTS

| | | | |
|---|---|---|---|
| 2,074,205 A | 3/1937 | Benedek | |
| 3,656,371 A | 4/1972 | Schaefer | |
| 3,726,094 A | 4/1973 | Schaefer | |
| 4,382,392 A | 5/1983 | Meyerle et al. | |
| 5,107,722 A * | 4/1992 | Nikolaus | B60W 10/04 477/68 |
| 11,719,334 B1 | 8/2023 | Dalla Palma et al. | |
| 12,104,694 B2 * | 10/2024 | Dalla Palma | F16H 61/42 |

(Continued)

*Primary Examiner* — Edwin A Young
(74) *Attorney, Agent, or Firm* — McCoy Russell LLP

(57) ABSTRACT

Methods and systems for transmission control are provided. In one example, a transmission system operating method includes maintaining a displacement set-point of a variable displacement hydraulic motor in a hydrostatic assembly within a working zone, where at least a portion of a boundary of the working zone is determined based on a kinematic constraint of the hydrostatic assembly. The transmission system includes the hydrostatic assembly that includes the variable displacement hydraulic motor that is hydraulically coupled in parallel with a variable displacement hydraulic pump and a gearbox mechanically coupled to the hydrostatic assembly and including one or more clutches.

18 Claims, 5 Drawing Sheets

(56) References Cited

U.S. PATENT DOCUMENTS

| | | | |
|---|---|---|---|
| 2007/0004547 A1 | 1/2007 | Ripamonti et al. | |
| 2010/0240483 A1* | 9/2010 | Legner | F16H 47/04 475/31 |
| 2011/0178684 A1* | 7/2011 | Umemoto | F16H 61/431 477/115 |
| 2013/0053210 A1 | 2/2013 | Kari et al. | |
| 2013/0068545 A1* | 3/2013 | Cronin | B62D 55/06 180/9.1 |
| 2015/0274149 A1 | 10/2015 | Behm | |

* cited by examiner

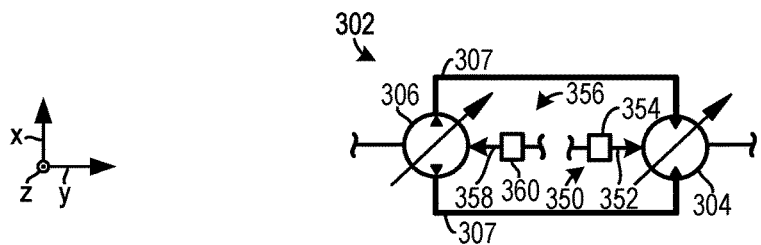

FIG. 3C

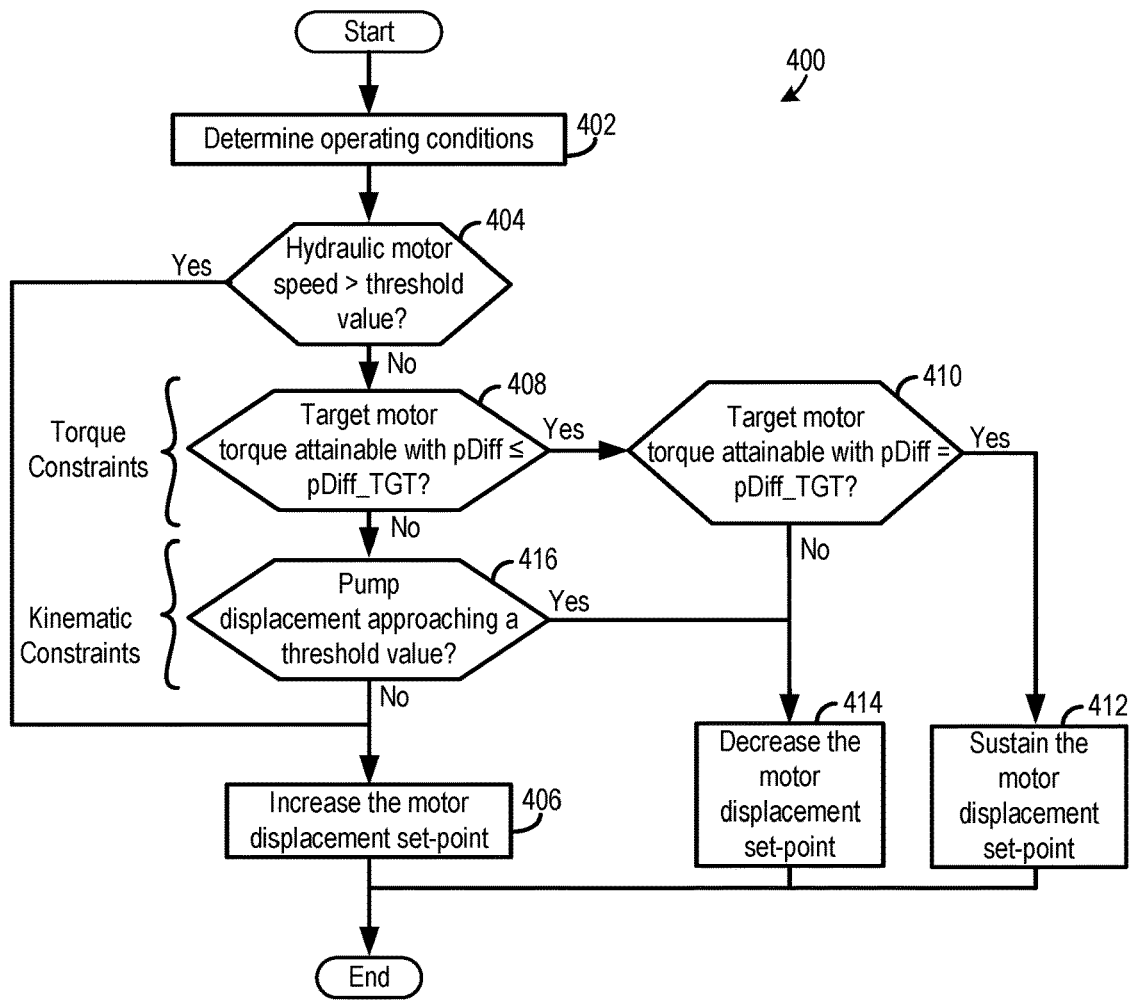

FIG. 4

|  | Second Reverse Drive Range | First Reverse Drive Range | First Forward Drive Range | Second Forward Drive Range | Third Forward Drive Range |
|---|---|---|---|---|---|
| Clutch (108) | Engaged | Disengaged | Disengaged | Disengaged | Disengaged |
| Clutch (152) | Disengaged | Engaged | Engaged | Disengaged | Disengaged |
| Clutch (110) | Disengaged | Disengaged | Disengaged | Engaged | Disengaged |
| Clutch (126) | Disengaged | Disengaged | Disengaged | Disengaged | Engaged |

FIG. 1B

HYDROMECHANICAL TRANSMISSION WITH HYDROSTATIC ASSEMBLY AND HYDROSTATIC ASSEMBLY CONTROL METHOD

CROSS REFERENCE TO RELATED APPLICATION

The present application is a continuation of U.S. Non-Provisional patent application Ser. No. 17/804,056, entitled "HYDROMECHANICAL TRANSMISSION WITH HYDROSTATIC ASSEMBLY AND HYDROSTATIC ASSEMBLY CONTROL METHOD", and filed on May 25, 2022. The entire contents of the above-listed application are hereby incorporated by reference for all purposes.

TECHNICAL FIELD

The present disclosure relates to a hydromechanical transmission and control strategy for a hydrostatic assembly of the hydromechanical transmission.

BACKGROUND AND SUMMARY

Hydromechanical transmissions enable performance characteristics such as efficiency, shift quality, drive characteristics, and control response from mechanical and hydrostatic transmissions to be combined to meet vehicle design objectives. Some hydromechanical transmissions, referred to in the art as hydromechanical variable transmissions (HVTs), provide continuously variable gear ratios. Hydromechanical transmissions may be particularly desirable due to their efficiency. Vehicles used in industries such as agriculture, construction, mining, material handling, oil and gas, and the like have made use of HVTs.

The inventors have recognized several drawbacks with previous hydromechanical transmission control strategies. For instance, hydraulic motors in previous hydromechanical transmissions may experience overspeeding during certain conditions which increases the chance of motor degradation and decreases motor lifespan. Further, during other conditions, the fluid in the hydraulic pump may become saturated, which may cause pump cavitation and degradation, in certain circumstances. Still further, some hydromechanical transmission control strategies may exhibit inefficiencies as well as constrain the transmission's maximum output torque, thereby hampering transmission performance.

To address at least some of the abovementioned issues the inventors developed a method for operation of a transmission system. The method includes, in one example, maintaining a displacement set-point of a variable displacement hydraulic motor in a hydrostatic assembly within a working zone. At least a portion of a boundary of the working zone is determined based on a kinematic constraint of the hydrostatic assembly. Further, the transmission system includes the hydrostatic assembly with the variable displacement hydraulic motor that is hydraulically coupled in parallel with a variable displacement hydraulic pump. The transmission system additionally includes a gearbox which is mechanically coupled to the hydrostatic assembly and includes one or more clutches. In this way, the system's operating efficiency is increased while enabling the controllability of hydraulic motor torque.

Further, in one example, the kinematic constraint of the hydrostatic assembly may provide continuity of a speed ratio of the transmission system during a shift event between two drive ranges of the transmission system. Further, in such an example, the continuity of the speed ratio is guaranteed by constraining the displacement set-point of the variable displacement hydraulic motor by a maximum hydraulic motor displacement that is determined based on a maximum displacement of the variable displacement hydraulic pump. In this way, power interruptions during shifting transients are avoided, thereby increasing the transmission's shifting performance. Customer appeal is even further increased as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 1B shows a table which indicates the configuration of the clutches in the hydromechanical transmission, shown in FIG. 1A, in different drive ranges.

FIG. 3C shows a hydraulic control system for the hydromechanical transmission system, depicted in FIGS. 3A-3B.

FIG. 4 shows a method for operation of a hydromechanical transmission system.

DETAILED DESCRIPTION

A hydromechanical transmission and method for operation of the transmission is described herein. The hydromechanical transmission includes a variable displacement hydraulic motor in a hydrostatic assembly. The transmission control scheme is designed to enable the transmission to reach an upper bound (e.g., maximum) of transmission output torque. The motor control scheme may further be designed to provide continuity of the transmission's speed ratio across shift points. In this way, undesirable torque interruptions during transmission operation may be avoided. Further, the transmission control scheme permits (e.g., guarantees) the controllability of motor torque and the avoidance of pump saturation, thereby reducing the chance of pump degradation. Further, the control scheme increases transmission efficiency from a hydrostatic assembly working point perspective. To achieve the aforementioned control strategy efficaciousness kinematic and/or torque constraints, associated with the transmission design, may be used to bound a working zone used for control of the variable displacement motor.

Figure 1A:
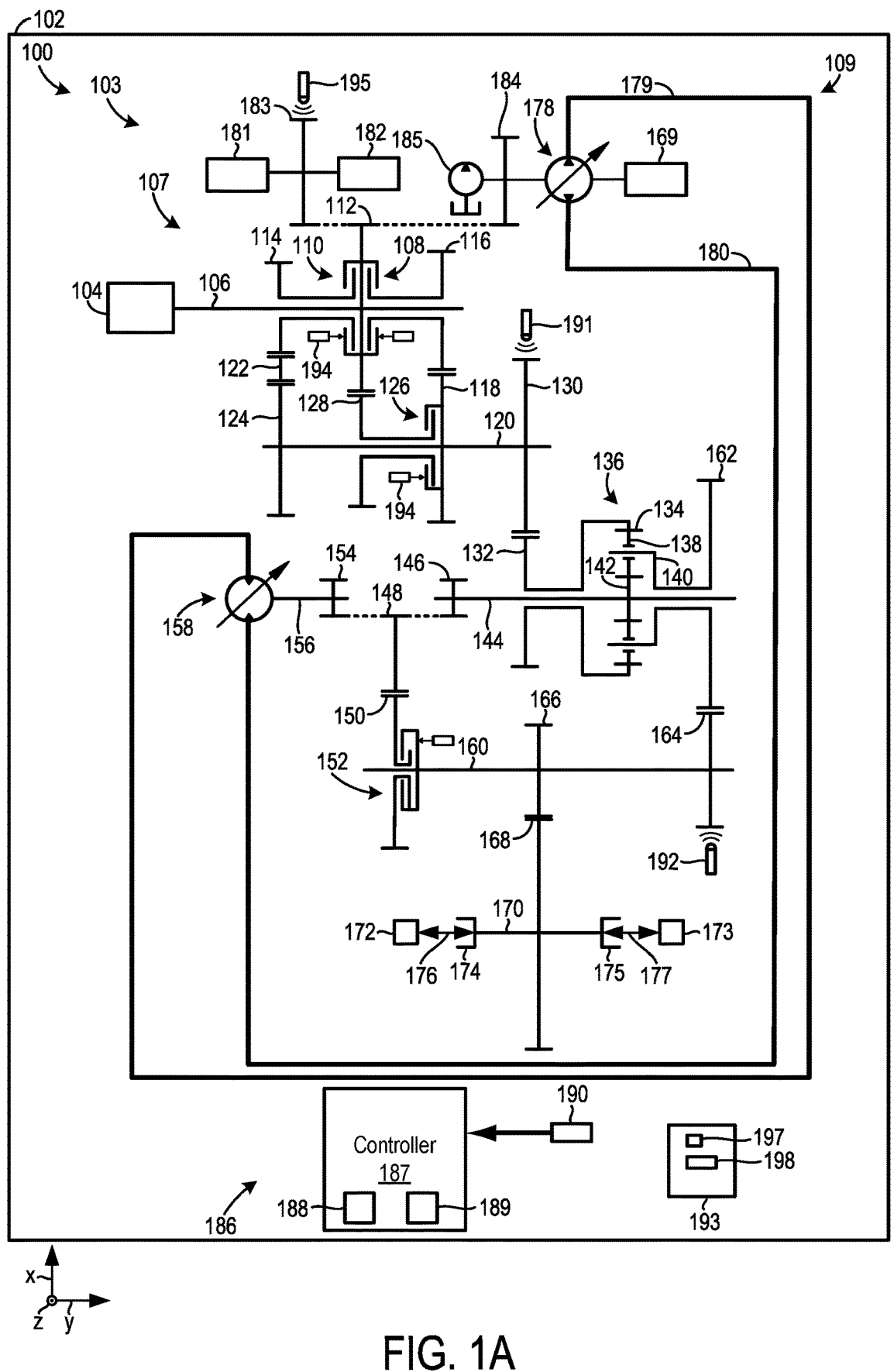
FIG. 1A shows a schematic representation of a vehicle with a hydromechanical transmission.

FIG. 1A shows a schematic depiction of a transmission system 100 (e.g., a hydromechanical variable transmission (HVT)) in a vehicle 102 or other suitable machine platform. It will be understood that the transmission system 100 includes a transmission 103. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable or suggested speed, for example. Industries and their corresponding operating environments in which the vehicle may be deployed include construction, forestry, mining, agriculture, and the like. In either case, the vehicle may be designed with auxiliary systems driven via hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios.

The transmission system 100 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of one or more additional clutch(s) which may increase system complexity.

The transmission system 100 may include or receive power from a prime mover 104. The prime mover 104 may include an internal combustion engine, electric machine (e.g., electric motor-generator), combinations thereof, and the like.

Gears, such as bevel gears, may be used to rotationally couple the prime mover 104 to an input shaft 106. The input shaft 106 may be included in a multi-speed gearbox 107 along with the gears, clutches, other shafts, and the like described in greater detail herein. This gearbox may be conceptually included in a mechanical branch of the transmission that may be coupled with a hydrostatic assembly 109, in parallel.

As described herein a parallel attachment between components, assemblies, and the like denotes that the input and output of the two components or grouping of components are coupled (e.g., rotationally coupled) to one another such that power (e.g., mechanical power in the case of mechanical attachment) flow therebetween. This parallel arrangement allows power to recirculate through the hydrostatic assembly, during some conditions, or be additively combined from the mechanical branch and the hydrostatic branch, during other conditions. As a result, the transmission's adaptability is increased, which allows gains in operating efficiency to be realized, when compared to purely hydrostatic transmissions.

Further, as described herein, a gear may be a mechanical component which rotates and includes teeth that are profiled to mesh with teeth in one or more corresponding gears to form a mechanical connection that allows rotational energy transfer therethrough. Further, the input and output shaft of the transmission are described with regard to a drive mode where the prime mover 104 is transferring mechanical power to the transmission and in turn the transmission is transferring mechanical power to downstream component such as axles, drive wheels, and the like.

A reverse clutch 108 and a clutch 110. The clutch 110 may be associated with a second drive range, discussed in greater detail herein, and therefore may be referred to as a second drive range clutch. The clutches 108 and 110 as well as the other clutches described herein may be friction clutches (e.g., wet friction clutches) and therefore may include plates (e.g., friction plates and separator plates) that frictionally engage one another during clutch engagement. During partial engagement or disengagement these plates are allowed to slip, thereby allowing the torque transfer through the clutch to be selectively augmented. Further, the clutches described herein may be hydraulically and/or electro-mechanically actuated. For instance, the clutches may include pistons 194 that adjust clutch engagement/disengagement responsive to adjustment of hydraulic fluid pressure in a piston chamber. Valves (e.g., hydraulic control valves) that may be electronically controlled, such as via a solenoid, may be used to adjust the pressure supplied to the clutches hydraulic actuator (e.g., the piston assembly). The clutches may further include drums, separators, carriers, and the like.

The reverse clutch 108 and the clutch 110 be designed to selectively engage a gear 112 that is arranged on the input shaft. To elaborate, engagement of the clutch 110 may couple the gear 112 for rotation with a gear 114. Conversely, engagement of the reverse clutch 108 may couple the gear 112 for rotation with a gear 116.

The gear 116 may be coupled to a gear 118 that rotates with the shaft 120. On the other hand, the gear 114 may mesh with a gear 122 that meshes with a gear 124 which rotates with the shaft 120. As such, the gears 118 and 124 may be fixedly coupled or otherwise attached for rotation with the shaft 120. In this way, the reverse clutch and the reverse clutch may deliver torque to the shaft 120 in opposite directions. A clutch 126 is positioned coaxial to the shaft 120 and is designed to selectively engage the gear 118 and a gear 128 which is coupled to the gear 112. The clutch 126 may be associated with a third drive range, discussed in greater detail herein. As such, the clutch 126 may be referred to as a third drive range clutch.

A gear 130 that may be fixedly attached to the shaft 120 for rotation therewith may mesh with a gear 132. The gear 132 may be coupled via a shaft or suitable structure to a ring gear 134 in a planetary gearset 136. The planetary gearset 136 may be a simple planetary gearset, although more complex planetary assemblies may be used, in other examples. As such, the planetary gearset 136 may include planet gears 138 that rotate on a carrier 140 and a sun gear 142.

The sun gear 142 may be fixedly coupled to a shaft 144 for rotation therewith. A gear 146 may be fixedly coupled for rotation with the shaft 144. The gear 146 may be coupled to a gear 148. The mechanical connection between these gears is signified via a dotted line and may be established via suitable mechanical components such as shafts, joints, and the like. The gear 148 may mesh with a gear 150 that is coupled to a clutch 152. The clutch 152 may be associated with a first drive range and therefore may be referred to as a first drive range clutch. A gear 154 may be coupled to a mechanical interface 156 of a hydraulic motor 158. The clutch 152 is designed to selectively permit torque transfer from the gear 150 to an output shaft 160. A gear 162 coupled to the carrier 140 may mesh with another gear 164 on the output shaft 160. Yet another gear 166 on the output shaft 160 may mesh with a gear 168 on a shaft 170 that functions as a connection for downstream components such as drive axles 172, 173. To elaborate, mechanical interfaces 174, 175 (e.g., yokes, joints, and the like) may connect the shaft 170 to the drive axles 172, 173. Arrows 176, 177 denote the mechanical power transfer between the axles 172, 173 and the mechanical interfaces 174, 175. A driveline with a shaft, joints, and the like may be used to carry out the mechanical power transfer between the transmission and the axles. It will be understood that the drive axles 172, 173 may be coupled to drive wheels.

The hydraulic motor 158 is included in the hydrostatic assembly 109. The hydraulic motor may be an axial piston variable motor such as a rotary type motor with an axial-tapered piston and a bent-axis design, for instance. More generally, the hydraulic motor is a variable displacement motor. The hydrostatic assembly 109 may further include a variable displacement hydraulic pump 178 (e.g., variable displacement bi-directional pump). Further, the hydraulic pump 178 may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 158 and the hydraulic pump 178 may be hydraulically coupled in parallel. Specifically, hydraulic lines 179, 180 are attached to hydraulic interfaces in each of the hydraulic motor 158 and the hydraulic pump 178 to enable the hydrostatic assembly to provide additive and power recirculation functionality with regard to a mechanical branch that is formed in the multi-speed gearbox 107 and coupled to (e.g., arranged in parallel with) the hydrostatic assembly 109. For example, in an additive power mode, power from both the hydrostatic and mechanical assemblies is combined at the planetary gearset 136 and delivered to the output shaft 160. Therefore, the hydraulic pump 178 and the hydraulic motor 158 may be operated to flow power to the planetary gearset 136. In a recirculating power mode, power is recirculated through the hydrostatic assembly 109 to the input of the multi-speed gearbox 107. Therefore, in the recirculating power mode, power flows from the hydrostatic assembly 109 to the gear 112.

The coupling of the hydrostatic assembly 109 to the multi-speed gearbox 107 enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

A first mechanical PTO 181 and/or a second mechanical PTO 182 may be coupled to a gear 183. In turn, the gear 183 may be mechanically coupled to the gear 112. The mechanical PTOs 181, 182 may drive auxiliary systems such as a pump (e.g., a hydraulic pump, a pneumatic pump, and the like), a winch, a boom, a bed raising assembly, and the like. To accomplish the power transfer to auxiliary components, the mechanical PTOs may include an interface, shaft(s), housing, and the like. However, in other examples, the mechanical PTOs may be omitted from the transmission system 100. Another PTO 169 may be rotationally coupled to the hydraulic pump 178.

A gear 184 coupled to the gear 116 may be rotationally attached to a charging pump 185. The charging pump 185 may be designed to deliver pressurized fluid to hydraulic components in the transmission such as the hydraulic motor 158, the hydraulic pump 178, and the like. The fluid pressurized by the charging pump 185 may additionally be used for clutch actuation and/or transmission lubrication. The charging pump 185 may include a piston, a rotor, a housing, chamber(s), and the like to allow the pump to move fluid.

A control system 186 with a controller 187 (e.g., transmission control unit (TCU), vehicle electronic control unit (ECU), combinations thereof, and the like) may further be incorporated in the transmission system 100. The controller 187 includes a processor 188 and memory 189. The memory 189 may hold instructions stored therein that when executed by the processor cause the controller 187 to perform the various methods, control strategies, etc., described herein. The processor 188 may include a microprocessor unit and/or other types of circuits. The memory 189 may include known data storage mediums such as random access memory, read only memory, keep alive memory, combinations thereof, and the like.

The controller 187 may receive vehicle data and/or various signals from sensors positioned in different locations in the transmission system 100 and/or the vehicle 102. The sensors may include gear speed sensors 191, 192, 195 which detect the speed of gear 130, gear 164, and gear 183, respectively. In this way, gear speed at the input and the output of the system may be detected along with the gear speed at the input of the planetary gearset 136. However, in other examples, the speeds of at least a portion of the gears may be modeled by the controller.

The controller 187 may send control signals to an actuator in the hydraulic pump 178 or an actuation system coupled to the pump to adjust the pumps output and/or direction of hydraulic fluid flow. Specifically, the controller may send signals to the pump to adjust its swash plate angle. Additionally, the clutches 108, 110, 126, 152 may receive commands (e.g., opening or closing commands) from the controller and actuators in the clutches or actuation systems coupled to the clutches may adjust the state of the clutch in response to receiving the command.

In one specific example, the clutches may be actuated via valves and hydraulically controlled pistons 194 that are included in a hydraulic control system 193, although other suitable clutch actuations systems have been envisioned such as electromechanical actuation systems and/or pneumatic actuation systems. The hydraulic control system 193 may include valves 197 that adjust the flow of hydraulic fluid supplied to the clutches (e.g., the control pistons) for actuation. The hydraulic control system 193 may further include hydraulic lines and a pump, in one example. Alternatively, the charging pump 185 may supply pressurized hydraulic fluid (e.g., oil) to the hydraulic control system or be included therein. The hydraulic control system 193, which may be in the form of a hydraulic circuit separate from the clutch control circuit, may further be configured to control the hydraulic motor 158 and/or the hydraulic pump 178. For instance, a solenoid 198 may be used to control the displacement of the hydraulic motor 158, in one example. In such an example, the displacement of the motor be proportional to the current provided to the solenoid. An exemplary hydraulic control system for the hydrostatic unit is discussed in greater detail herein with regard to FIG. 3C.

The other controllable components in the transmissions system include the hydraulic pump 178, the hydraulic motor 158, the prime mover 104, and the like. These controllable components may function similarly with regard to receiving control commands and adjusting an output and/or a state of a component responsive to receiving the command via an actuator. Additionally or alternatively, an ECU may be provided in the vehicle to control the power source (e.g., engine and/or motor). Furthermore, the control system 186 and specifically the controller 187 with the memory 189 and processor 188 may be configured to carry out the transmission control strategies elaborated upon herein with regard to FIGS. 4-8.

The transmission system 100 may include an input device 190 (e.g., an accelerator pedal, a control-stick, levers, buttons, combinations thereof, and the like). The input device 190, responsive to driver input, may generate a transmission speed or torque adjustment request and a desired drive direction (a forward or reverse drive direction). Further, the transmission system may automatically switch between drive modes when demanded. To elaborate, the operator may request a forward or reverse drive mode speed or torque change, and the transmission may increase speed or torque and automatically transition between the drive ranges associated with the different drive modes, when desired (e.g., when the transmission approaches a desired shift point). Further, in one example, the operate may request reverse drive operation while the vehicle is operating in a forward drive mode. In such an example, the transmission may automatically initiate a transition between the forward and reverse drive modes. In this way, the operator may more efficiently control the vehicle. It will further be appreciated that the prime mover 104 may be controlled in tandem with the transmission 103. For instance, when a speed or torque adjustment request is received by the controller, the prime mover's output speed or torque may be correspondingly increased.

The transmission system 100 may additionally include a lubrication system which may include a sump, as previously discussed. The lubrication system may further include conventional components for lubricating the gears and/or the clutches such as pumps, conduits, valves, and the like.

Figure 2:
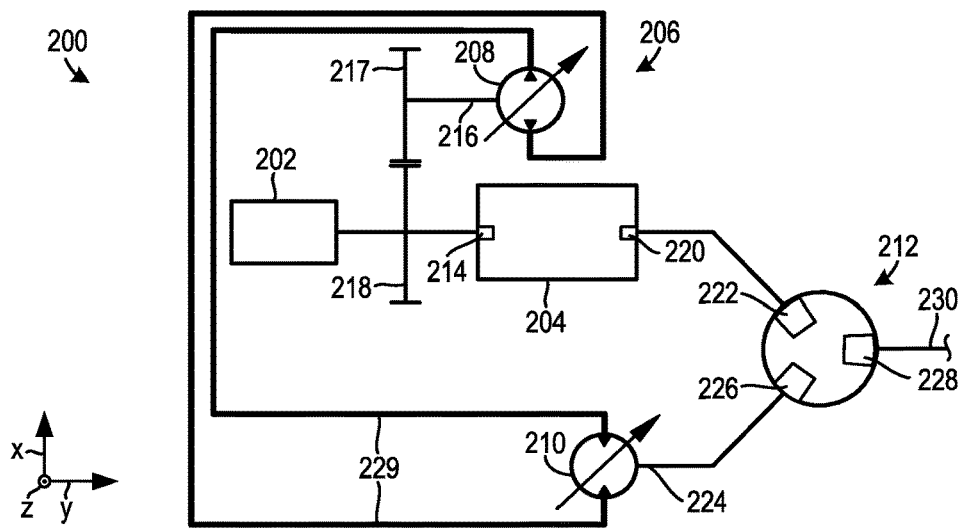
FIG. 2 shows a schematic representation of an example of a hydromechanical transmission system.

An axis system is provided in FIG. 1A, as well as FIGS. 2-3C, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 1B shows a chart 199 that illustrates the configurations (engaged or disengaged) of the clutches 108, 110, 126, 152, shown in FIG. 1A in the different drive ranges (a second reverse drive range, a first reverse drive range, a first forward drive range, a second forward drive range, and a third forward drive range). The clutch 108 may be referred to as a reverse clutch, the clutch 152 may be referred to as a first drive range clutch, the clutch 110 may be referred to a second drive range clutch, and the clutch 126 may be referred to as a third drive range clutch. However, other clutch configurations may be used, in other embodiments.

In the second reverse drive range, the reverse clutch 108 is engaged while the clutches 110, 126, 152 are disengaged. Additionally, in the first reverse drive range, the clutch 152 is engaged while the clutches 108, 110, 126 are disengaged. In the first forward drive range, the clutch 152 is engaged while the clutches 108, 110, 126 are disengaged. In the second forward drive range, the clutch 110 is engaged while the clutches 108, 126, 152 are disengaged. Further, in the third forward drive range, the clutch 126 is engaged while the clutches 108, 110, 152 are disengaged. Shifting operation between these drive ranges is expanded upon herein with regard to FIGS. 5-6. The transmission system 100 may achieve forward and reverse directions by changing the motor speed direction that acts on the variable displacement hydraulic pump 178, shown in FIG. 1A, and can change the hydraulic fluid (e.g., oil) flow direction.

FIG. 2 shows a schematic depiction of a transmission system 200 with a higher level architecture than is depicted in FIG. 1A. However, in the transmission system 200 shown in FIG. 2, at least a portion of its components as well as the other transmission systems described herein (e.g., the transmission system 300, shown in FIGS. 3A, 3B, and 3C) may have similar structure and/or functionality to components included in the transmission system 100, depicted in FIG. 1A. Redundant description is therefore omitted for brevity.

The transmission system 200 includes prime mover 202 (e.g., internal combustion engine and/or electric motor), a multi-speed gearbox 204, a hydrostatic assembly 206 with a hydraulic pump 208 and a hydraulic motor 210, and a planetary gearset 212 (e.g., a simple planetary gearset). The prime mover 202 is coupled to an input 214 of the multi-speed gearbox 204. It will be understood, that the gearbox input 214 serves as a mechanical input during drive operation. However, during other system modes, mechanical power may flow through this gearbox interface in the opposite direction. Further, a mechanical interface 216 (e.g., a shaft) of the hydraulic pump 208 is also coupled to the input 214 of the multi-speed gearbox 204. Gears 217, 218 that mesh with one another may allow this connection between the hydraulic pump 208 and the multi-speed gearbox 204, although other suitable mechanical connections have been contemplated.

An output interface 220 of the multi-speed gearbox 204 is coupled to a gear 222 (e.g., a ring gear) in the planetary gearset 212. A mechanical interface 224 (e.g., shaft) of the hydraulic motor 210 may be coupled to another gear 226 (e.g., a sun gear) in the planetary gearset 212. Yet another component 228 (e.g., a carrier) in the planetary gearset 212 may be coupled to a transmission output shaft 230. The hydraulic motor 210 and the hydraulic pump 208 in the hydrostatic assembly 206 are again hydraulically coupled in parallel via hydraulic lines 229.

Figure 3A:
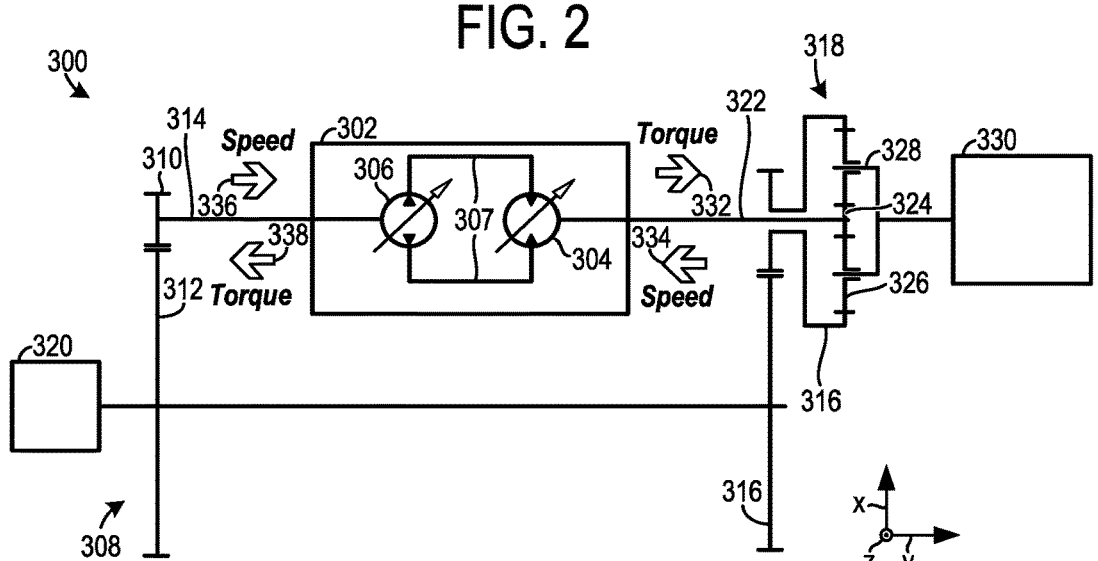
FIGS. 3A and 3B show torque and speed control modes, respectively, in an example of a hydromechanical transmission system.
Figure 3B:
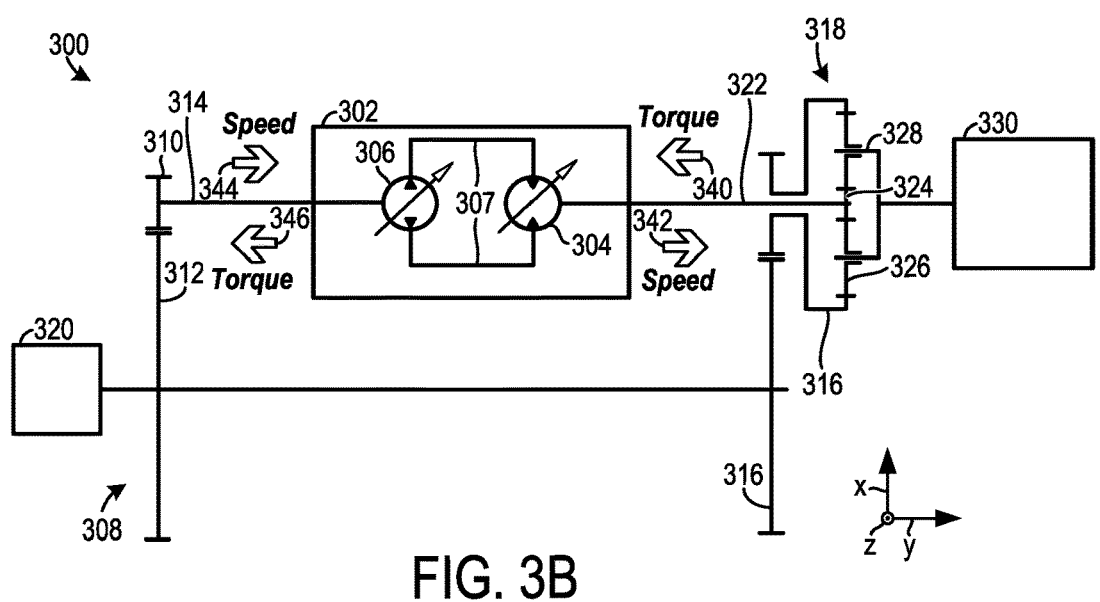

FIGS. 3A and 3B show yet another schematic depiction of a transmission system 300. The transmission system 300 again includes a hydrostatic assembly 302 with a hydraulic motor 304 and a hydraulic pump 306 hydraulically coupled in parallel via lines 307. Further, a mechanical assembly 308 is mechanically coupled in parallel with the hydrostatic assembly 302. To elaborate, gears 310, 312 may serve to mechanically attach the mechanical assembly 308 to an interface 314 of the hydrostatic assembly 302 and a gear 316 may further serve to attach the mechanical assembly 308 to a gear 316 (e.g., a ring gear) of the planetary gearset 318.

An engine 320 or other suitable prime mover is coupled to the mechanical assembly 308 at one end, and a planetary gearset 318 is coupled to the mechanical assembly at the other end. Further, the hydrostatic assembly 302 may also couple to the planetary gearset 318 via a shaft 322 that is attached to a sun gear 324. The planetary gearset 318 further includes planet gears 326 which rotate on a carrier 328. The transmission system 300 is shown coupled to downstream components 330 such as axles, wheels, and the like.

Turning specifically to FIG. 3A, in the torque control mode, the hydraulic pump 306 is controlled to follow a hydraulic motor torque reference, referred to as a motor torque set-point. Due to the control of the hydraulic pump 306 using the motor torque reference in the torque control mode. Put another way, in the torque control mode, the control of the hydraulic pump may follow a motor torque reference and is not controlled using a motor speed reference. Arrows 332, 334 characterize the torque and speed conversion that occurs on the motor side of the hydrostatic assembly 302. Conversely, arrows 336, 338 characterize speed and torque conversion on the pump side of the hydrostatic assembly.

Turning to FIG. 3B, in the speed control mode, the hydraulic pump 306 is controlled to follow a hydraulic motor speed reference, referred to as a motor speed set-point. Due to the hydraulic pump 306 being controlled to follow motor speed reference, the motor torque as a consequence is not controlled. In other words, while in the speed control mode, the hydraulic pump is controlled according to a motor speed reference and control of the pump using a motor torque reference is negated. Arrows 340, 342 characterize the torque and speed conversion that occurs on the motor side of the hydrostatic assembly 302 and conversely, arrows 344, 346 characterize speed and torque conversion on the pump side of the hydrostatic assembly.

FIG. 3C shows a detailed view of the hydrostatic assembly 302 with the hydraulic pump 306 and the hydraulic motor 304 hydraulically coupled via hydraulic lines 307. FIG. 3C further shows a hydraulic control system 350 for the hydraulic motor 304. The hydraulic control system 350 includes one or more hydraulic conduit(s) 352 that provide hydraulic fluid to the hydraulic motor 304 for adjustment of the motor's displacement and therefore speed. A solenoid 354 is designed to receive a current from a controller, such as the controller 187 shown in FIG. 1A. The solenoid 354 alters the flow of fluid to the hydraulic motor 304 for displacement adjustment. As such, the amount of current supplied to the solenoid 354 may be proportional to the displacement of the hydraulic motor 304. The hydraulic pump 306 may also be adjusted via a hydraulic control assembly 356 including one or more hydraulic conduit(s) 358 coupled to the pump and whose flow may be modified via a solenoid 360, during certain conditions. For instance, when the hydrostatic unit is operated in a torque control mode the hydraulic pump is controlled to follow a torque reference of the hydraulic motor and when the hydrostatic unit is operated in a speed control mode the pump is controlled to follow a speed reference of the motor.

FIG. 4 shows a method 400 for operation of a transmission system. The method 400 and/or the other methods and control techniques described herein may be carried out by any of the transmissions and components described above with regard to FIGS. 1-3C or combinations thereof, in one example. However, in other examples, the method 400 and/or the other methods may be implemented using other suitable transmissions and corresponding components. Further, the method 400 and the other methods, control strategies, and the like may be carried out as instructions stored in non-transitory memory executed by a processor in a controller. As such, performing the method steps may include sending and/or receiving commands which trigger adjustment of associate components, as previously indicated.

At 402, the method includes determining operating conditions. The operating conditions may include hydraulic motor speed, hydraulic motor speed set-point, hydraulic pump torque, hydraulic pump torque set-point, hydrostatic unit differential pressure, transmission speed, transmission load, transmission torque, vehicle speed, operator torque request, operator speed request, prime mover speed, prime mover load, clutch positions, ambient temperature, transmission temperature, and the like. These operating conditions may be determined using sensor data and/or modeling algorithms.

At 404, the method includes judging if the current hydraulic motor speed is greater than a threshold value. This threshold value may be indicative of an over-speed condition in which the motor speed has surpassed an upper bound of desired motor speed or is approaching the upper bound of the desired motor speed. The threshold motor speed may be a value that is determined based on the motor's mechanical characteristics. For instance, in one use-case example, the hydraulic motor speed threshold value may be 5,000 revolutions per minute (RPM). However, other threshold values may be used, in alternate examples, and this motor speed threshold may be determined based on motor design characteristics. Further, the current hydraulic motor speed may be determined from a speed sensor coupled to the motor shaft and/or modeled based on other sensor inputs. Implementing step 404, in the hydromechanical transmission control strategy enables the likelihood of an overspeed condition of the hydraulic motor in the hydrostatic assembly to be reduced, thereby reducing the chance of motor degradation.

If it is determined that the current hydraulic motor speed is greater than the threshold value (YES at 404) the method moves to 406 where the method includes increasing the motor displacement set-point. It will be appreciated, that as motor displacement is increased, motor speed is reduced and vice versa. As such, the motor speed is reduced to discontinue or avoid the motor overspeed condition. Consequently, the likelihood of motor degradation is decreased, thereby increasing motor reliability and longevity.

Conversely, if it is determined that the current hydraulic motor speed is not greater than the threshold value (NO at 404) the method moves to 408. At 408, the method includes judging if the target motor torque can be reached with the differential pressure of the hydrostatic unit (pDiff) being less than or equal to a target differential pressure of the hydrostatic unit (pDiff_TGT), expressed as pDiff≤pDiff_TGT. The desired motor torque may be determined based on an operator requested torque which may be sent to the controller via an input device (e.g., accelerator and/or a brake pedal).

If it is determined that the target motor torque can be reached when pDiff≤pDiff_TGT (YES at 408), the method moves to 410. At 410, the method includes judging if a desired hydraulic motor torque can be reached when pDiff=pDiff_TGT.

If it is judged that the desired motor torque can be reached when pDiff=pDiff_TGT (YES at 410) the method moves to 412 where the method includes sustaining the last hydraulic motor displacement set-point.

If it is judged that the desired motor torque cannot be reached when pDiff=pDiff_TGT (NO at 410), the method moves to 414 where the method includes decreasing the motor displacement set-point.

Conversely, if it is determined that the target motor torque cannot be reached when pDiff≤pDiff_TGT (NO at 408) the method moves to 416. At 416, the method includes judging if the pump displacement is approaching an upper threshold value (e.g., maximum value). This threshold value may correspond to a saturation pressure of the pump's working fluid.

If it is determined that the pump displacement is approaching the upper threshold value (YES at 416) the method proceeds to 414. Conversely, if it is determined that the pump displacement is not approaching the upper threshold value (NO at 416) the method moves to 406. In this way, the hydrostatic unit's control strategy enables controllability of motor torque while reducing the likelihood (e.g., avoiding) of saturation of the hydraulic pump in the hydrostatic unit.

In FIG. 4, steps 408 and 410 are indicated as torque constraints and step 414 is indicated as a kinematic constraint. These constraints are used to control hydraulic motor displacement and speed, correspondingly. The torque constraints permit the transmission to achieve maximum output torque, if so desired. Further, the torque constraints enable (e.g., guarantee) the controllability of hydraulic motor torque while avoiding the saturation of the hydraulic pump. The torque and kinematic constraints that bound the hydraulic motor control are explained in greater detail by way of non-limiting example with regard to FIGS. 7A-7C.

Figure 5:
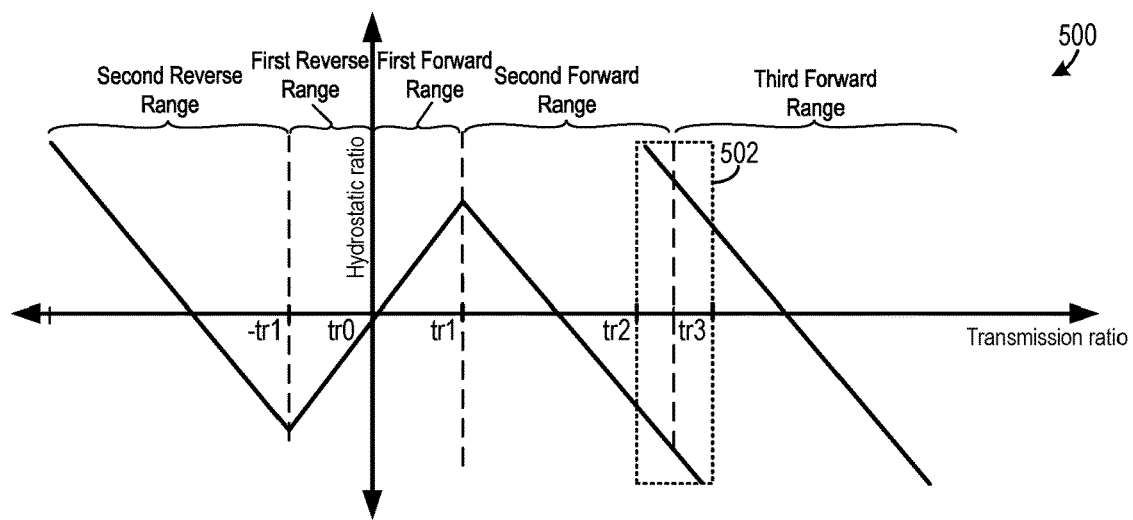
FIG. 5 shows a graphical depiction of a hydrostatic ratio vs. mechanical ratio in a hydromechanical transmission.

FIG. 5 shows a prophetic and exemplary graphical depiction 500 of the transmission system's hydrostatic ratio vs. mechanical ratio. Although specific values are not indicated on the abscissa or ordinate, points above the abscissa represent positive hydrostatic ratios and points below the abscissa represent negative hydrostatic ratios. Further, points to the left of the ordinate represent negative transmission ratios corresponding to reverse drive operation and points to the right of the ordinate represent positive transmission ratios corresponding to forward drive operation, increasing from left to right.

Specifically, the second reverse drive range occurs from −tr2 to −tr1 where the hydrostatic ratio decreases and turns negative part-way through the drive range. A transition from the second reverse drive range to the first reverse drive range may occur at a hydrostatic ratio inflection point (e.g., a minimum hydrostatic ratio). As such, at the inflection point, the hydrostatic assembly's power flow direction inverts. The first reverse drive range occurs from −tr1 to tr0 where the hydrostatic ratio increases. The transition between the first reverse drive range and the second reverse drive range occurs when the hydrostatic ratio turns positive. The first forward drive range occurs from tr0 to tr1 where the hydrostatic ratios continues to increase and specifically turns positive at tr0. The second forward drive range occurs from tr1 to tr2 where the hydrostatic ratio decrease and turns negative part way through the drive range. The transition from the first forward drive range to the second forward range may occur at a hydrostatic ratio inflection point (e.g., a maximum hydrostatic ratio). Further, a shift window 502 from tr2 to tr3 involves inverting the hydrostatic ratio, thereby reverting motor speed. A third forward drive range occurs from t3 to t4 where the hydrostatic ratio is decreased.

The shift events between the second reverse drive range and the first reverse drive range as well as between the first forward drive range and the second forward drive range occurs synchronously where the hydrostatic ratio reaches a maximum negative value or maximum positive value, respectively and begins to increase and decrease. During these synchronous shift events at the inflection of the hydrostatic ratio, one clutch may be fully engaged while the other clutch is fully disengaged. Further, it will be understood, that during the synchronous shift event, the hydrostatic unit may reach an upper differential pressure (e.g., maximum differential pressure). The shift event between the second forward drive range and the third forward drive range occur asynchronously.

Figure 6:
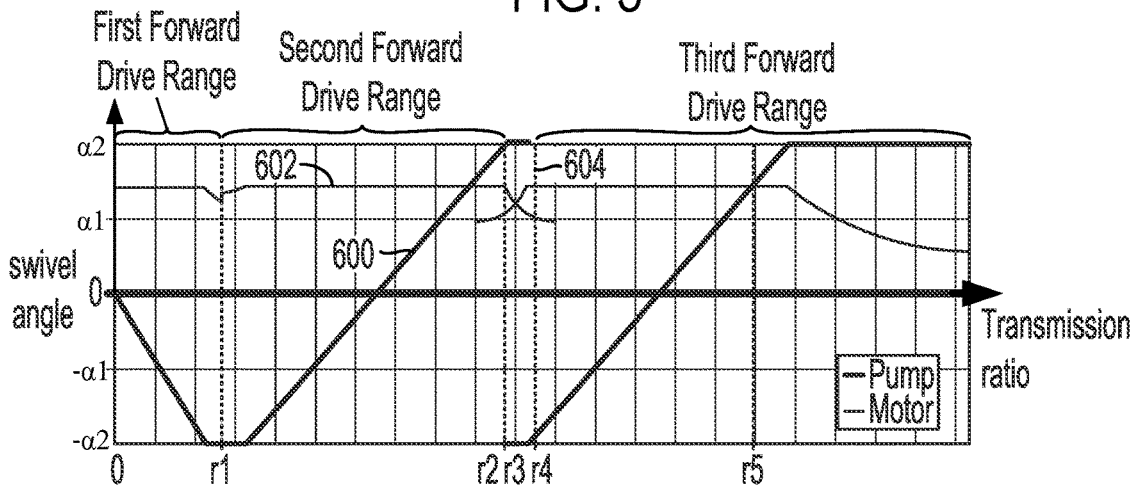
FIG. 6 shows a swivel angle diagram for the hydraulic pump and the hydraulic motor in a hydromechanical transmission system.

FIG. 6 shows prophetic exemplary graphical depictions of a normalized swivel angle of the hydraulic pump and the hydraulic motor in the hydrostatic assembly vs. transmission ratio. Although specific numerical values are not provided in FIG. 6, points above the abscissa represent positive swivel angles, points below the abscissa represent negative swivel angles, and transmission ratio increases from left to right.

Specifically, plot 600 is associated with the hydraulic motor and plot 602 is associated with the hydraulic pump. Further, a portion of the transmission's drive ranges (the first drive range through the third drive range) are demarcated along the abscissa. The hydraulic pump and motor as well as other transmission components referenced with regard to FIG. 6 as well as the other graphs described herein may correspond to the hydraulic motors, pumps, and components described with regard to FIGS. 1-3C.

From 0 to r1 the pump's swivel angel decreases along with the motor's swivel angle. At r1 a synchronous shift is performed. The synchronous shift may be triggered at a hydrostatic ratio inflection point. The hydrostatic assembly's power flow direction is commanded to invert as consequence of the shift, synchronously with a clutch hand-over via controlling the hydrostatic assembly in torque control mode. It will be understood that a clutch hand-over includes bringing one clutch into engagement while disengaging another clutch. To elaborate, during the synchronous shift the pump's swivel angle reaches a minimum value (e.g., $-\alpha 2$). The hydraulic pump's swivel angle at the synchronous shift may be a dynamic value, and may depend on the variable displacement hydraulic motor angle and on volumetric efficiency (e.g., the magnitude of torque delivered by the hydrostatic motor). The pump's swivel angle may not be actively controlled but is a consequence of the load, since the hydrostatic may be torque controlled in the synchronous shift phase. During the synchronous shift, the hydrostatic assembly changes the high-pressure side, meaning that the power flow direction inverters: from a pump-to-motor direction to a motor-to-pump direction or vice versa. As such, at r1 the high pressure side of the hydrostatic assembly may switch from a push condition to a pull condition.

From r1 to r2 the pump's swivel angel increases and the motor's swivel angle remains relatively constant. Specifically, at r2 the pump's swivel angle reaches a maximum value (e.g., $\alpha 2$).

The shifting window corresponding to the transition between the second forward drive range and the third forward drive range is indicated at 604. In the shift window, from r2 to r3, the pump's swivel angle is inverted. Consequently, the motor's speed and more generally the hydrostatic assembly's speed is reversed. During the speed reversal, the motor's swivel angle is decreased and then increased while its speed is reverted. As previously discussed with regard to FIG. 6, the motor speed is reverted while the clutches involved in the shift are slipping where one clutch is engaged while the other is disengaged. The motor speed inversion results in synchronization of the incoming clutch. In this way, the transmission can efficiently transition between the second forward drive range and the third forward drive range with little or no power interruption.

Figure 7A:
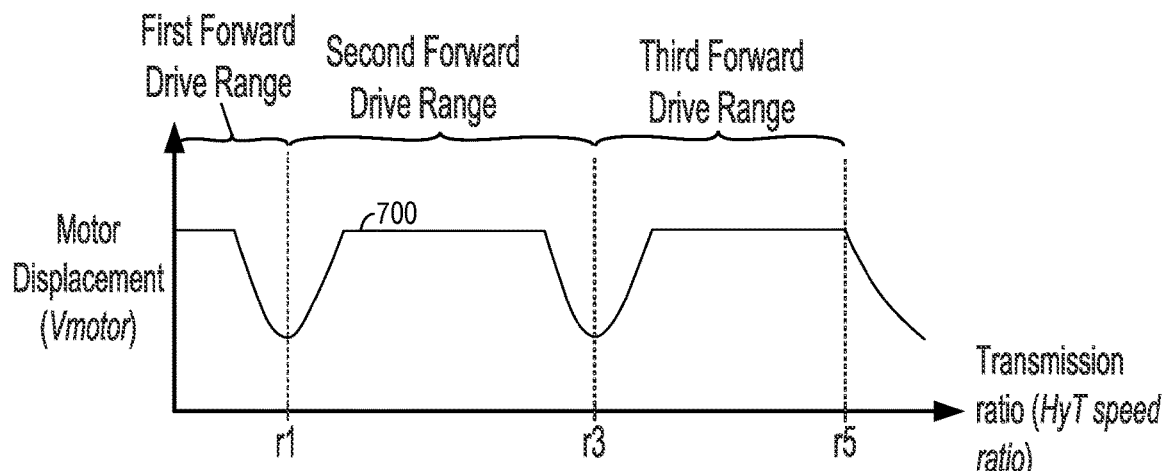
FIGS. 7A-7C show exemplary plots of motor displacement vs. transmission ratio corresponding to the kinematic and torque constraints.
Figure 7B:
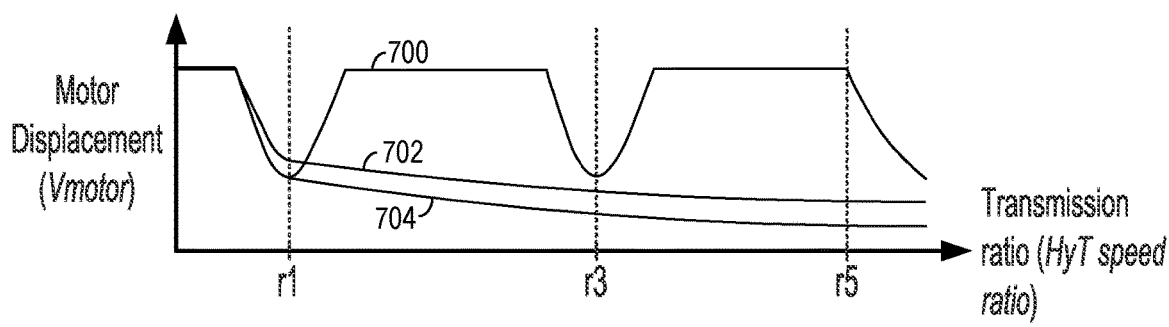
Figure 7C:
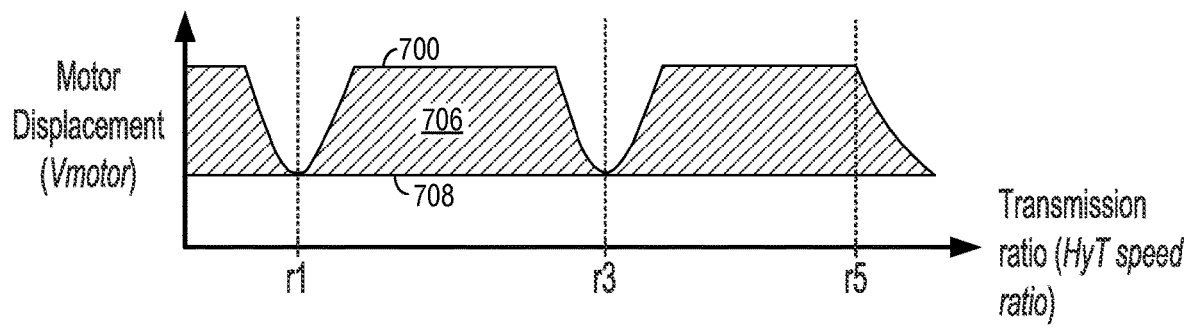

FIGS. 7A-7C show prophetic exemplary graphical depictions of motor displacement vs. transmission ratio plots which correspond to different equations representing kinematic and torque constraints which may be used for hydraulic motor control. To elaborate, the graphs show a sequential application of the constraints on the hydraulic motor control strategy to arrive at a strategy where a working zone in which the variable displacement of the hydraulic motor may be controlled is defined. Further, the hydraulic motor may be controlled in this working zone while the hydraulic variable speed pump is torque controlled. The strategy described in relation to FIGS. 7A-7C may be used to control any of the hydraulic motors in the hydrostatic assemblies of the transmissions shown in FIGS. 1A-3B. For instance, the control strategy may be used to control the hydraulic motor 158, shown in FIG. 1A. Further, the control strategy may be used during transmission operation when mechanical power is flowing from the motive power source to the transmission to the drive wheels. Moreover, the motor control strategy when the transmission is operating in any of the aforementioned drive modes as well as during the transitions between the drive modes, referred to as shift events. Further, ratios r1, r3, and r5 correspond to the ratios depicted in FIG. 6. Therefore, the ratio r1 occurs at a shift point between the first forward drive range and the second forward drive range, ratio r3 occurs at a shift point between the second forward drive range and the third forward drive range, and r5 occurs in the third forward drive range. The kinematic constraints discussed with regard to FIG. 7A provide an example of the kinematic constraints discussed in relation to step 416, shown in FIG. 4. The torque constraints discussed with regard to FIG. 7B provide an example of the torque constraints discussed in relation to steps 408 and 410, shown in FIG. 4.

FIG. 7A illustrates a plot 700 corresponding to a kinematic constraint that may be imposed on the hydraulic motor. To elaborate, plot 700 represents a maximum motor displacement demanded to satisfy a kinematic constraint assuming the maximum hydraulic pump displacement. Further, plot 700 indicates an upper boundary of a working zone that is discussed in greater detail herein with regard to FIG. 7C. The kinematic constraints may be set by the hydrostatic ratios vs. transmission ratios in the different operating drive ranges as dictated in FIG. 6, for instance. In this way, the continuity of the transmission speed ratio and corresponding hydrostatic speed ratio across shift points (e.g., both synchronous and asynchronous shift points) may be maintained, thereby enhancing shifting performance. The maximum motor displacement which satisfies the kinematic constraints embodied in plot 700 may be calculated using equation (1).

$$V_{motor\ max} = k \cdot \frac{V_{pump\ max}}{HyT_{speed\ ratio}} \quad \text{\{equation (1)\}}$$

$V_{motor\ max}$ is a maximum motor displacement, k is a gain term, $V_{pump\ max}$ is a maximum pump displacement, and $HyT_{speed\ ratio}$ is the speed ratio of the hydromechanical transmission. As such, equation 1 expressed the maximum motor displacement demanded to satisfy the kinematic constraint assuming that the pump is at its maximum displacement. The motor control may be bounded by the maximum motor speed expressed in plot 700.

Turning to FIG. 7B which illustrates a plot 702 along with the plot 700. The plot 702 corresponding to a minimum motor displacement demanded to satisfy a torque constraint assuming the differential pressure of the hydrostatic unit is equal to a maximum differential pressure (pDiff=pDiff_MAX). The torque constraint may be torque constraint that guarantees to reachability of maximum transmission output torque. To elaborate, the minimum motor displacement demanded to satisfy the maximum motor torque assuming that pDiff=pDiff_MAX may be calculated using equation (2).

$$V_{motor\ min} = k \cdot \frac{\text{Torque max}}{p_{diffMAX}} \quad \text{\{equation (2)\}}$$

$V_{motor\ min}$ is a minimum motor displacement, k is a gain term, Torque max is the maximum torque of transmission, and $P_{diffMAx}$ is the maximum differential pressure of the hydrostatic assembly.

FIG. 7B further shows plot 704 corresponding to a minimum motor displacement demanded to satisfy a torque constraint assuming the differential pressure of the hydrostatic unit is equal to a target differential pressure (pDiff=pDiff_TGT). To elaborate, the minimum motor displacement demanded to satisfy the maximum motor torque assuming that pDiff=pDiff_TGT may be calculated using equation (3).

$$V_{motor\ min} = k \cdot \frac{\text{Torque max}}{p_{diffTGT}} \quad \text{\{equation (3)\}}$$

Figure 8:
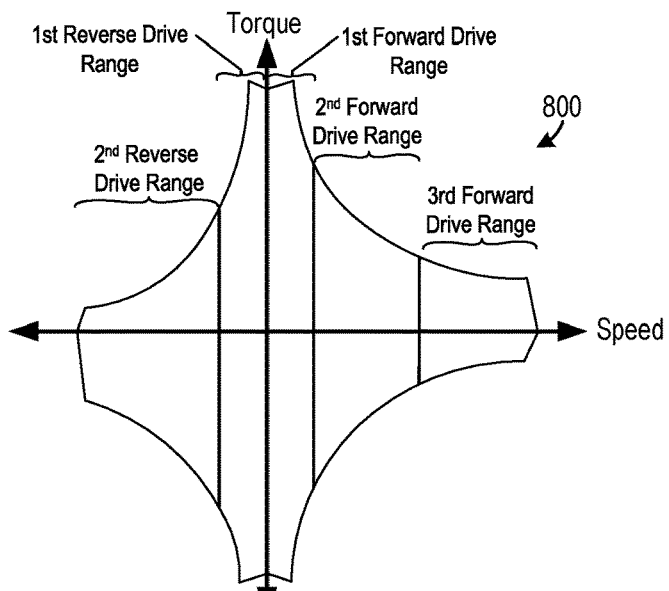
FIG. 8 shows an exemplary plot of torque vs. speed for a transmission system.

$p_{diffTGT}$ is the target differential pressure of the hydrostatic assembly. It will be appreciated that the maximum transmission torque is reachable when the target differential pressure is equal to the maximum differential pressure (pDiff_TGT=pDiff_MAX). FIG. 8 shows an exemplary plot 800 of torque vs. speed from which the maximum motor torque may be ascertained. Continuing with FIG. 7B, the minimum motor displacement for the motor's working zone which is demanded to satisfy the maximum torque demand may be calculated based on the assumption that pDiff≤pDiff_TGT≤pDiff_MAX.

FIG. 7C shows a working zone 706 that is bounded by the plot 700 and a minimum motor displacement constraint 708. The hydraulic motor may be controlled such that a target displacement set-point for the motor lies within the boundary of the working zone. The constraint 708 serves as a lower boundary of the working zone 706. Further, the minimum motor displacement constraint 708 may be associated with the kinematic constraints discussed with regard to FIG. 7B. As such, the working zone may be defined by the aforementioned kinematic constraint and the torque constraints. As such, the motor displacement demanded to reach a desired motor torque assuming the differential pressure equals the target differential pressure (pDiff=pDiff_TGT) may be calculated using equation (4).

$$V_{motor} = k \cdot \frac{\text{Torque}}{p_{diffTGT}} \quad \text{\{equation (4)\}}$$

The target differential pressure may be chosen based on the efficiency working points of the hydrostatic unit. For instance, the target differential pressure may be one half of the hydrostatic assembly's operation range. Specifically, in one use-case example, the target differential pressure may be approximately 20,000 kilopascals (kPa). More generally, the target differential pressure may be in a range between 15,000 kPa and 20,000 kPa. However, other suitable target differential pressures may be used in other examples.

The technical effect of the transmission system operating methods described herein is to increase transmission efficiency and enhance transmission controllability by operating a variable displacement pump in a hydrostatic assembly in a working zone that is bounded by a kinematic constraint and/or torque constraints.

FIGS. 1-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method for operating a transmission system is provided that comprises maintaining a displacement set-point of a variable displacement hydraulic motor in a hydrostatic assembly within a working zone, wherein at least a portion of a boundary of the working zone is determined based on a torque constraint of the hydrostatic assembly; wherein the transmission system includes: the hydrostatic assembly that includes the hydraulic motor that is hydraulically coupled in parallel with a variable displacement hydraulic pump; and a gearbox mechanically coupled to the hydrostatic assembly and including one or more clutches. The method may further include, in one example, operating a hydraulic pump in the hydrostatic in a torque control mode where the hydraulic pump is controlled to follow a hydraulic motor torque reference.

In another aspect, a transmission system is provided that comprises a hydrostatic assembly including a variable displacement hydraulic pump and a variable displacement hydraulic motor; a multi-speed gearbox coupled to the hydrostatic assembly; and a controller including instructions stored in non-transitory memory that when executed, during a first operating condition, cause the controller to: maintain a displacement set-point of the variable displacement hydraulic pump in a working zone that is determined based on a torque constraint of the hydrostatic assembly.

In yet another aspect, a method for operating a hydromechanical variable transmission (HVT) system is provided that comprises: during a first operating condition, operating a variable displacement hydraulic pump in a torque control mode, wherein the variable displacement hydraulic pump is included in a hydrostatic assembly; and maintaining a displacement set-point of a variable displacement hydraulic motor in the hydrostatic assembly within a working zone, wherein at least a portion of a boundary of the working zone is determined based on a torque constraint of the hydrostatic assembly; wherein the HVT system includes: the hydrostatic assembly that includes the variable displacement hydraulic motor that is hydraulically coupled in parallel with the variable displacement hydraulic pump; a gearbox mechanically coupled to the hydrostatic assembly. The method may further comprise, in one example, adjusting the displacement set-point within the working zone based on an efficiency of the hydrostatic assembly.

In another aspect, a method for operation of a transmission system is provided that comprises maintaining a displacement set-point of a variable displacement hydraulic motor in a hydrostatic assembly within a working zone, wherein at least a portion of a boundary of the working zone is determined based on a kinematic constraint of the hydrostatic assembly; wherein the transmission system includes: the hydrostatic assembly that includes the variable displacement hydraulic motor that is hydraulically coupled in parallel with a variable displacement hydraulic pump; a gearbox mechanically coupled to the hydrostatic assembly and including one or more clutches.

In another aspect, a hydromechanical variable transmission (HVT) system is provided that comprises a hydrostatic assembly including a variable displacement hydraulic pump and a variable displacement hydraulic motor; a multi-speed gearbox coupled to the hydrostatic assembly; a controller including instructions stored in non-transitory memory that when executed, during a first operating condition, cause the controller to: adjust a displacement set-point of the variable displacement hydraulic pump to maintain a speed of the variable displacement hydraulic motor within in a working zone that is determined based on a kinematic constraint of the hydrostatic assembly.

In yet another aspect, a method for operation of a hydromechanical variable transmission (HVT) system is provided that comprises operate a variable displacement hydraulic pump in a torque control mode, wherein the variable displacement hydraulic pump is included in a hydrostatic assembly; maintaining a displacement set-point of a variable displacement hydraulic motor in a hydrostatic assembly within a working zone, wherein at least a portion of a boundary of the working zone is determined based on a kinematic constraint of the hydrostatic assembly; wherein the HVT system includes: the hydrostatic assembly that includes the variable displacement hydraulic motor that is hydraulically coupled in parallel with the variable displacement hydraulic pump; a gearbox mechanically coupled to the hydrostatic assembly and including one or more clutches. The method may further comprise, in one example, increasing the set-point of the variable displacement hydraulic motor in response to the speed of the variable displacement hydraulic motor exceeding the threshold value.

In any of the aspects or combinations of the aspects, the torque constraint may be determined based on a maximum torque of the motor.

In any of the aspects or combinations of the aspects, the torque constraint may be determined based on a target differential pressure of the hydrostatic unit.

In any of the aspects or combinations of the aspects, the target differential pressure may be determined based on an efficiency of the hydrostatic unit.

In any of the aspects or combinations of the aspects, maintaining the displacement set-point of the variable displacement hydraulic pump within the working zone may include maintaining a target differential pressure of the hydrostatic unit less than or equal to a maximum differential pressure of the hydrostatic unit to guarantee controllability of a torque of the variable displacement hydraulic motor.

In any of the aspects or combinations of the aspects, a lower boundary of the working zone may be determined based on the torque constraint.

In any of the aspects or combinations of the aspects, an upper boundary of the working zone may be determined based on a kinematic constraint of the hydrostatic assembly.

In any of the aspects or combinations of the aspects, maintaining the displacement set-point within the working zone may include adjusting the displacement set-point based on a motor speed threshold that is indicative of an overspeed condition.

In any of the aspects or combinations of the aspects, a lower boundary of the working zone may be determined based on the torque constraint.

In any of the aspects or combinations of the aspects, the torque constraint may be a minimum displacement of the variable displacement hydraulic motor that can achieve a maximum output torque of the hydrostatic assembly assuming that the differential pressure of the hydrostatic assembly is equal to a maximum differential pressure of the hydrostatic assembly.

In any of the aspects or combinations of the aspects, an upper boundary of the working zone may be determined based on a kinematic constraint.

In any of the aspects or combinations of the aspects, maintaining the displacement set-point of the variable displacement hydraulic pump within the working zone may include selecting the displacement set-point based on an efficiency of the hydrostatic unit.

In any of the aspects or combinations of the aspects, the transmission system may further comprise a hydraulic control assembly coupled to the variable displacement hydraulic motor and including a solenoid that is designed to receive a current and proportionally adjust the displacement of the variable displacement hydraulic motor based on the current applied to the solenoid.

In any of the aspects or combinations of the aspects, the first operating condition may be a condition where a speed of the variable displacement hydraulic motor is less than a threshold value that is indicative of an overspeed condition.

In any of the aspects or combinations of the aspects, the controller may further include instructions stored in non-transitory memory that when executed, during the first operating condition, cause the controller to: operate the hydraulic pump in a torque control mode.

In any of the aspects or combinations of the aspects, the first operating condition may be a condition where a speed of the variable displacement hydraulic motor is less than a threshold value that is indicative of an overspeed condition.

In any of the aspects or combinations of the aspects, the displacement set-point may be maintained in the working zone in response to a speed of the variable displacement hydraulic motor being less than a threshold value which is indicative of an overspeed condition.

In any of the aspects or combinations of the aspects, the kinematic constraint of the hydrostatic assembly may provide continuity of a speed ratio of the transmission system during a shift event between two drive ranges of the transmission system.

In any of the aspects or combinations of the aspects, the continuity of the speed ratio may be guaranteed by constraining the displacement set-point of the variable displacement hydraulic motor by a maximum hydraulic motor displacement that is determined based on a maximum displacement of the variable displacement hydraulic pump.

In any of the aspects or combinations of the aspects, maintaining the displacement set-point of the variable displacement hydraulic motor within the working zone may include adjusting the displacement set-point within the working zone using a target differential pressure of the hydrostatic assembly that is selected based on an efficiency of the hydrostatic assembly.

In any of the aspects or combinations of the aspects, maintaining the displacement set-point of the variable displacement hydraulic motor within the working zone may include increasing the displacement set-point when a displacement of the variable displacement hydraulic pump is approaching a maximum value and reducing the displacement set-point when the displacement of the variable displacement hydraulic pump is not approaching the maximum value.

In any of the aspects or combinations of the aspects, the working zone may guarantee torque control of the variable displacement hydraulic pump.

In any of the aspects or combinations of the aspects, the working zone may avoid saturation of the variable displacement hydraulic motor by maintaining a differential pressure of the hydrostatic assembly less than or equal to a maximum differential pressure of the hydrostatic assembly.

In any of the aspects or combinations of the aspects, the working zone may be determined based on a target differential pressure of the hydrostatic assembly that is selected based on an efficiency of the hydrostatic assembly.

In any of the aspects or combinations of the aspects, the working zone may be further determined based on a torque constraint.

In any of the aspects or combinations of the aspects, an upper boundary of the working zone may be defined by the kinematic constraint and a lower boundary of the working zone is defined by the torque constraint.

In any of the aspects or combinations of the aspects, the HVT system may further comprise a hydraulic control assembly coupled to the variable displacement hydraulic motor and including a solenoid that is designed to receive a current and proportionally adjust the displacement of the variable displacement hydraulic motor based on the current applied to the solenoid.

In any of the aspects or combinations of the aspects, the multi-speed gearbox may include a plurality of clutches designed to shift the HVT system between a plurality of drive ranges.

In any of the aspects or combinations of the aspects, the working zone may be bounded to enable the hydrostatic assembly to reach a maximum differential pressure during shifting transients.

In any of the aspects or combinations of the aspects, the HVT system may further comprise a planetary gear set mechanically coupled to: the multi-speed gearbox; the variable displacement hydraulic motor; and a transmission output shaft.

In any of the aspects or combinations of the aspects, the displacement set-point may be maintained in the working zone in response to a speed of the variable displacement hydraulic motor being less than a threshold value which is indicative of an overspeed condition.

In any of the aspects or combinations of the aspects, maintaining the displacement set-point in the working zone may include adjusting the displacement set-point based on a comparison between a displacement of the variable displacement hydraulic pump to a maximum displacement of the variable displacement hydraulic pump.

In any of the aspects or combinations of the aspects, the working zone may be determined based on a target differential pressure of the hydrostatic assembly that is selected based on an efficiency of the hydrostatic assembly.

In any of the aspects or combinations of the aspects, a first portion of a boundary of the working zone may be defined by the kinematic constraint and a second portion of the boundary of the working zone may be defined by a torque constraint.

In another representation, a method for a controlling a hydrostatic unit in a transmission is provided that comprises adjusting a displacement of a variable displacement hydraulic motor based on one or more of a torque constraint and a kinematic constraint.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken to change a state of a device. The specific routines described herein may represent one or more of a variety of processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

As used herein, the terms "approximately" may be construed to mean plus or minus three percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a transmission, comprising:
adjusting a displacement set-point of a variable displacement hydraulic motor in a hydrostatic assembly based on a kinematic constraint and/or a torque constraint of the hydrostatic assembly;
wherein the transmission includes:
the hydrostatic assembly that includes the variable displacement hydraulic motor that is hydraulically coupled in parallel with a variable displacement hydraulic pump; and
a multi-speed gearbox mechanically coupled to the hydrostatic assembly and including one or more clutches; and
wherein the kinematic constraint is determined based on a saturation pressure of a working fluid of the variable displacement hydraulic pump.

2. The method of claim 1, wherein adjusting the displacement set-point includes maintaining the displacement set-point within a working zone that is defined by a displacement of the variable displacement hydraulic motor vs a ratio of the transmission.

3. The method of claim 1, wherein adjusting the displacement set-point includes increasing the displacement set-point based on a displacement of the variable displacement hydraulic pump and a maximum displacement of the variable displacement hydraulic pump.

4. The method of claim 1, wherein adjusting the displacement set-point includes increasing the displacement set-point based on a differential pressure of the hydrostatic assembly and a target differential pressure of the hydrostatic assembly.

5. The method of claim 4, wherein increasing the displacement set-point based on the differential pressure of the hydrostatic assembly and the target differential pressure of the hydrostatic assembly includes increasing the displacement set-point when a target motor torque is able to be reached with the differential pressure of the hydrostatic assembly being less than the target differential pressure of the hydrostatic assembly.

6. The method of claim 1, wherein adjusting the displacement set-point includes sustaining the displacement set-point based on a differential pressure of the hydrostatic assembly and a target differential pressure of the hydrostatic assembly.

7. The method of claim 6, wherein sustaining the displacement set-point based on the differential pressure of the hydrostatic assembly and the target differential pressure of the hydrostatic assembly includes sustaining the displacement set-point when a target hydraulic motor torque is able to be reached when the differential pressure equals the target differential pressure.

8. The method of claim 1, wherein adjusting the displacement set-point includes decreasing the displacement set-point based on a differential pressure of the hydrostatic assembly and a target differential pressure of the hydrostatic assembly.

9. The method of claim 8, wherein the displacement set-point is decreased when a target hydraulic motor torque is not able to be reached when the differential pressure equals the target differential pressure.

10. A transmission, comprising:
a hydrostatic assembly including a variable displacement hydraulic pump and a variable displacement hydraulic motor;
a multi-speed gearbox coupled to the hydrostatic assembly; and
a controller including instructions that when executed cause the controller to:
adjust a displacement set-point of the variable displacement hydraulic motor based on a kinematic constraint and/or a torque constraint of the hydrostatic assembly;
wherein the torque constraint is determined based a differential pressure and a target differential pressure of the hydrostatic assembly.

11. The transmission of claim 10, wherein the kinematic constraint is determined based on a maximum displacement of the variable displacement hydraulic pump.

12. The transmission of claim 10, wherein adjusting the displacement set-point includes decreasing or sustaining the displacement set-point based on a differential pressure and a target differential pressure of the hydrostatic assembly.

13. The transmission of claim 10, wherein the multi-speed gearbox has asymmetric forward and reverse drive ranges.

14. The transmission of claim 13, wherein the multi-speed gearbox includes three forward drive ranges and two reverse drive ranges.

15. The transmission of claim 10, wherein the multi-speed gearbox includes a planetary gear set.

16. A method for operation of a hydromechanical variable transmission (HVT), comprising:
adjusting a displacement set-point of a variable displacement hydraulic motor in a hydrostatic assembly based on a kinematic constraint and a torque constraint of the hydrostatic assembly;
wherein the HVT includes:
the hydrostatic assembly that includes the variable displacement hydraulic motor that is hydraulically coupled in parallel with a variable displacement hydraulic pump; and
a multi-speed gearbox mechanically coupled to the hydrostatic assembly and including one or more clutches.

17. The method of claim 16, wherein adjusting the displacement set-point includes decreasing or sustaining the displacement set-point based on a differential pressure and a target differential pressure of the hydrostatic assembly and increasing the displacement set-point based on a displacement of the variable displacement hydraulic pump and a maximum displacement of the variable displacement hydraulic pump.

18. The method of claim 16, wherein the kinematic constraint is determined based on a saturation pressure of a working fluid of the variable displacement hydraulic pump.

* * * * *